US012145273B2

(12) United States Patent
Hirota (10) Patent No.: US 12,145,273 B2
(45) Date of Patent: Nov. 19, 2024

(54) INFORMATION PROCESSING APPARATUS AND METHOD, ROBOT CONTROLLING APPARATUS AND METHOD, AND NON-TRANSITORY COMPUTER-READABLE STORAGE MEDIUM

(71) Applicant: CANON KABUSHIKI KAISHA, Tokyo (JP)

(72) Inventor: Yuichiro Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 17/100,196

(22) Filed: Nov. 20, 2020

(65) Prior Publication Data

US 2021/0072734 A1   Mar. 11, 2021

Related U.S. Application Data

(63) Continuation of application No. PCT/JP2019/019318, filed on May 15, 2019.

(30) Foreign Application Priority Data

May 28, 2018   (JP) .................................. 2018-101357

(51) Int. Cl.
   *B25J 9/16*      (2006.01)
   *G05B 19/4155*   (2006.01)
   (Continued)

(52) U.S. Cl.
   CPC ............... *B25J 9/163* (2013.01); *B25J 9/161* (2013.01); *B25J 9/1697* (2013.01);
   (Continued)

(58) Field of Classification Search
   CPC . B25J 9/163; B25J 9/161; B25J 9/1697; B25J 13/08; G05B 19/4155;
   (Continued)

(56) References Cited

U.S. PATENT DOCUMENTS

| 10,730,181 B1* | 8/2020 | Rajkumar | G06N 3/045 |
|---|---|---|---|
| 2012/0054131 A1* | 3/2012 | Williamson | G06N 20/00 |
| | | | 706/12 |

(Continued)

FOREIGN PATENT DOCUMENTS

| CN | 107562050 A | 1/2018 |
|---|---|---|
| CN | 107977668 A | 5/2018 |

(Continued)

OTHER PUBLICATIONS

Zhang, F., et al., "Towards Vision-Based Deep Reinforcement Learning for Robotic Motion Control", Proceedings of the Australasian Conference on Robotics and Automation (ACRA), 2015.

*Primary Examiner* — Jonathan L Sample
*Assistant Examiner* — Sagar Kc
(74) *Attorney, Agent, or Firm* — Canon U.S.A., Inc., IP Division (57) ABSTRACT

The invention provides an information processing apparatus comprising a first acquiring unit which acquires, from an external apparatus which can communicate with the information processing apparatus via a network, a first learning model which outputs recognition information in response to input of image information; a learning unit which causes the first model to learn a result of control by the information processing apparatus using recognition information that is output from a second learning model in response to input of the image information in an execution environment; and an output unit which causes the first learning model learned by the learning unit to output recognition information by inputting image information in the execution environment to the first learning model.

9 Claims, 9 Drawing Sheets

(51) Int. Cl.
| | |
|---|---|
| *G06F 18/20* | (2023.01) |
| *G06F 18/21* | (2023.01) |
| *G06F 18/214* | (2023.01) |
| *G06N 3/08* | (2023.01) |
| *G06V 10/774* | (2022.01) |
| *G06V 10/778* | (2022.01) |
| *G06V 20/10* | (2022.01) |
| *G06V 20/64* | (2022.01) |
| *B25J 13/08* | (2006.01) |

(52) U.S. Cl.
CPC ....... *G05B 19/4155* (2013.01); *G06F 18/214* (2023.01); *G06F 18/217* (2023.01); *G06F 18/285* (2023.01); *G06N 3/08* (2013.01); *G06V 10/774* (2022.01); *G06V 10/7784* (2022.01); *G06V 20/10* (2022.01); *G06V 20/64* (2022.01); *B25J 13/08* (2013.01); *G05B 2219/40499* (2013.01)

(58) Field of Classification Search
CPC ......... G05B 2219/40499; G06F 18/214; G06F 18/217; G06F 18/285; G06N 3/08; G06N 20/00; G06V 10/774; G06V 10/7784; G06V 20/10; G06V 20/64; G06V 2201/06; G06V 2201/12
See application file for complete search history.

(56) References Cited

U.S. PATENT DOCUMENTS

| | | | |
|---|---|---|---|
| 2018/0260628 A1* | 9/2018 | Namiki | ................ G06V 20/10 |
| 2019/0207672 A1* | 7/2019 | Arora | ................ H04B 7/18584 |
| 2020/0311616 A1* | 10/2020 | Rajkumar | .............. G06N 3/008 |

FOREIGN PATENT DOCUMENTS

| | | |
|---|---|---|
| JP | H04-135207 A | 5/1992 |
| JP | H11-175132 A | 7/1999 |
| JP | 2003-203171 A | 7/2003 |
| JP | 2004-199391 A | 7/2004 |
| JP | 2015-100877 A | 6/2015 |
| JP | 6088679 B1 | 3/2017 |
| JP | 2017-084104 A | 5/2017 |
| JP | 2017-144532 A | 8/2017 |
| JP | 2017-156886 A | 9/2017 |
| JP | 2017-188030 A | 10/2017 |

* cited by examiner

INFORMATION PROCESSING APPARATUS AND METHOD, ROBOT CONTROLLING APPARATUS AND METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2019/019318, filed May 15, 2019, which claims the benefit of Japanese Patent Application No. 2018-101357, filed May 28, 2018, both of which are hereby incorporated by reference herein in their entirety.

BACKGROUND OF THE INVENTION

Field of the Invention

The present invention relates to information processing apparatus and method, robot controlling apparatus and method, and a non-transitory computer-readable storage medium.

Background Art

A robotic system that performs a task based on a recognition result obtained by machine learning has recently been studied. In general, a robot installed in an environment needs to perform a task repeatedly a large number of times in a trial-and-error manner in a real-world environment in order to learn a model so that the robot can perform the task at a sufficiently high success rate. This takes much time.

NPL1 discloses a technique in which a robot performs a task virtually in a trial-and-error manner in a simulation environment to learn a model fast and the learned model is then given to a robot in a real-world environment so that the robot can perform a task a relatively small number of trial-and-error times for incremental learning.

CITATION LIST

Non Patent Literature

NLT1: Fangyi Zhang, Jurgen Leitner, Michael Milford, Ben Uperoft, Peter Corke, "Towards Vision-Based Deep Reinforcement Learning for Robotic Motion Control," in Proceedings of the Australasian Conference on Robotics and Automation (ACRA), 2015, ANU, Canberra, Australia.

However, in a robotic system installed in an environment where the system needs to operate at all times, like a robot in operation at a plant, it is difficult for the robot to perform a task in a trial-and-error manner for incremental learning of the given model.

SUMMARY OF THE INVENTION

According to an aspect of the invention, there is provided an information processing apparatus comprising:

a first acquiring unit configured to acquire, from an external apparatus which can communicate with the information processing apparatus via a network, a first learning model which outputs recognition information in response to input of image information;

a learning unit configured to cause the first model to learn a result of control by the information processing apparatus using recognition information that is output from a second learning model in response to input of the image information in an execution environment; and an output unit configured to cause the first learning model learned by the learning unit to output recognition information by inputting image information in the execution environment to the first learning model.

According to the present invention, a model acquired from the outside of a user's robotic system installed in a user environment can be introduced into the robotic system without performing a task in a trial-and-error manner through the robotic system.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present invention and together with the description serve to explain the principles of the present invention.

DESCRIPTION OF THE EMBODIMENTS

Embodiments of the present invention will be described below with reference to the drawings.

First Embodiment

In a first embodiment, a robotic system that is installed in a user plant and performs a gripping task to suck and pick up a target object with a suction hand will be taken as an example, and a method whereby the robotic system introduces a new model (hereinafter, referred to as a "candidate model") released on an external server will be described. The term "model" as used herein refers to information on a function having learning parameters. In this embodiment, the model is a neural network model. In the embodiment, the robotic system performs a task with a model (hereinafter, referred to as an "execution model") currently held in the robotic system, thereby collecting learning data. The learning data is used to perform incremental learning of a candidate model newly acquired in the background. When the candidate model has performance that meets a predetermined level set by a user, the execution model is replaced with the candidate model. Thus, the robotic system in operation in an environment specific to the user can introduce the candidate model released on the server without performing a special task in a trial-and-error manner.

Figure 1:
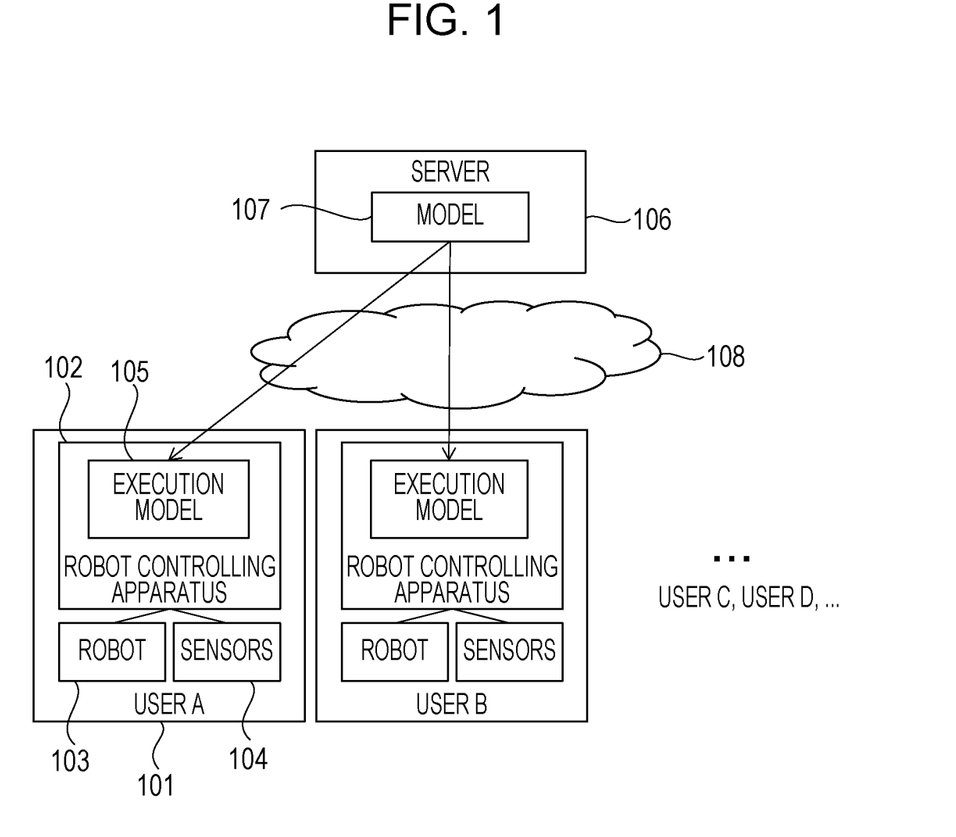
FIG. 1 is a diagram illustrating exemplary schematic configurations of robotic systems.

FIG. 1 is a diagram illustrating schematic configurations of robotic systems according to the first embodiment and a relationship between the robotic systems and an external server, for example. A robotic system 101 is a robotic system that a user A uses. The robotic system 101 includes a robot controlling apparatus 102, a robot 103 connected to the robot controlling apparatus 102, and sensors 104. The robot controlling apparatus 102 holds therein an execution model 105. The execution model 105 receives, as an input, information acquired from the sensors 104 and outputs a recognition result. The robot controlling apparatus 102 controls the robot 103 (six-axis articulated robot including an arm in the embodiment) based on the recognition result to perform a task. The robot controlling apparatus 102 is connected to an external server 106 via the Internet 108. When the server 106 releases a new model 107, the robot controlling apparatus 102 acquires the model 107 as a candidate model via a network. The robot controlling apparatus 102 performs incremental learning so that the candidate model achieves a task with a sufficient performance in a user environment and then replaces the execution model 105 with the candidate model. The server 106 is similarly connected to a robot controlling apparatus possessed by a user B and a robot controlling apparatus possessed by another user as well as the robot controlling apparatus 102 possessed by the user A. Each user can download the model 107 on the server to the robotic system in operation in their environment and use the model. The execution model and the candidate model may differ from each other in the number of learning parameters held therein and network structure as long as these models receive information in the same format as inputs and output information in the same format. The server 106 is an example of an external apparatus capable of communicating with the robot controlling apparatus 102 via the network.

Figure 2:
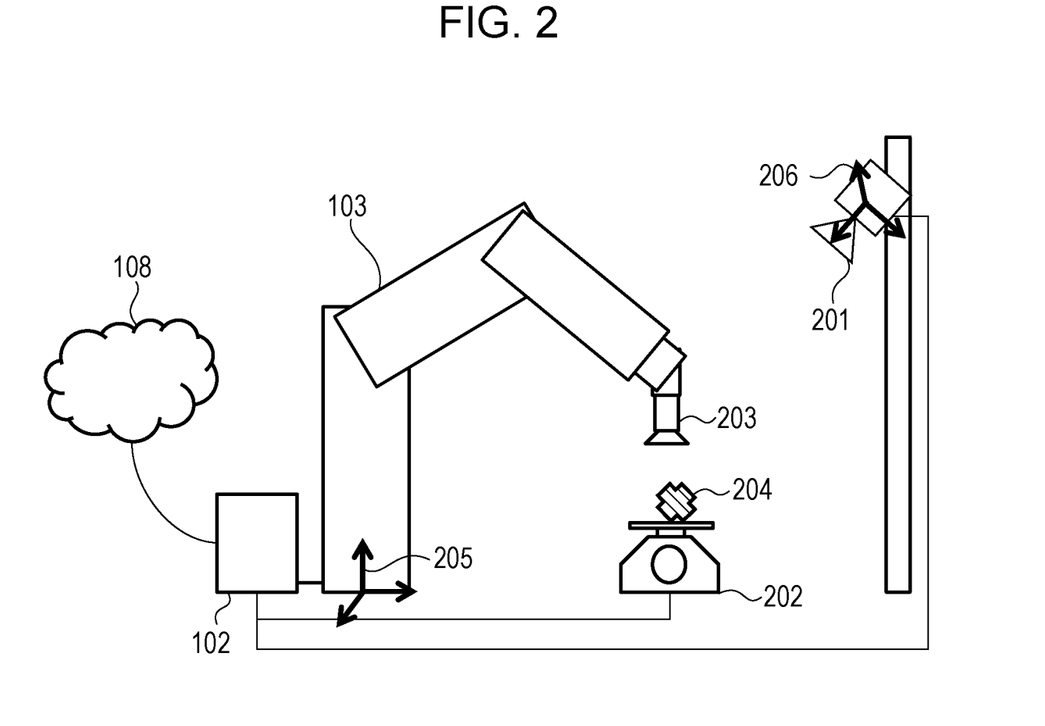
FIG. 2 is a diagram illustrating an exemplary appearance of a robotic system.

FIG. 2 is a diagram illustrating an appearance of the robotic system 101 and coordinate systems used for explanation of the embodiment. The robot controlling apparatus 102 is connected to the robot 103, the Internet 108, and the sensors 104. More specifically, the sensors 104 in the embodiment include an RGB-D camera 201 and an electronic scale 202. The robot 103 includes a flange to which a suction nozzle 203 is attached, and starts and terminates air suction in response to instructions from the robot controlling apparatus 102. A target object 204 to be picked up by the robot 103 is fed and placed at a random position and orientation on the electronic scale 202.

The coordinate systems will now be described. A robot coordinate system 205 is a robot coordinate system having an origin at the center of a base of the robot 103. When the robot controlling apparatus 102 designates a position and orientation of the suction nozzle 203 expressed in the robot coordinate system 205, the robot 103 moves the arm to position the suction nozzle 203 in the designated position and orientation. A camera coordinate system 206 is a camera coordinate system. The RGB-D camera 201 captures an RGB image and a depth image, which are images when viewed from the origin of the camera coordinate system in a Z-axis positive direction. The robotic system 101 holds relative coordinate conversion, which is computed in advance, between the robot coordinate system and the camera coordinate system.

Figure 3:
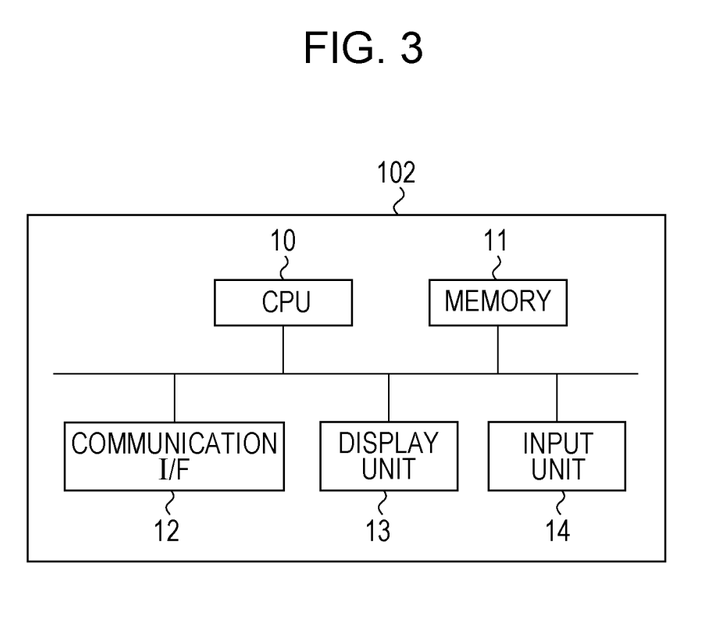
FIG. 3 is a diagram illustrating an exemplary hardware configuration of a robot controlling apparatus.

FIG. 3 is a diagram illustrating an exemplary hardware configuration of the robot controlling apparatus 102. The robot controlling apparatus 102 includes, as hardware components, a central processing unit (CPU) 10, a memory 11, a communication interface (I/F) 12, a display unit 13, and an input unit 14. The CPU 10 controls an overall process of the robot controlling apparatus 102. The memory 11 stores, for example, programs and data that is used when the CPU 10 executes a process based on a program. The communication I/F 12 controls communication with the robot 103, the server 106, and the sensors 104. The display unit 13 is, for example, a display, and outputs a processing result of the CPU 10, for example. The input unit 14 includes a mouse and a keyboard, receives a user operation, and notifies the CPU 10 of the received user operation. The CPU 10 reads out a program stored in the memory 11 and executes a process based on the read program, thereby implementing a functional configuration of the robot controlling apparatus 102 illustrated in FIGS. 4 and 7, which will be described later. Furthermore, the CPU 10 reads a program stored in the memory 11 and executes a process based on the read program, thereby implementing a process in flowcharts of FIGS. 5A and 5B or a flowchart of FIG. 8, which will be described later. The display unit 13 and the input unit 14 are not essential components of the robot controlling apparatus 102.

Figure 4:
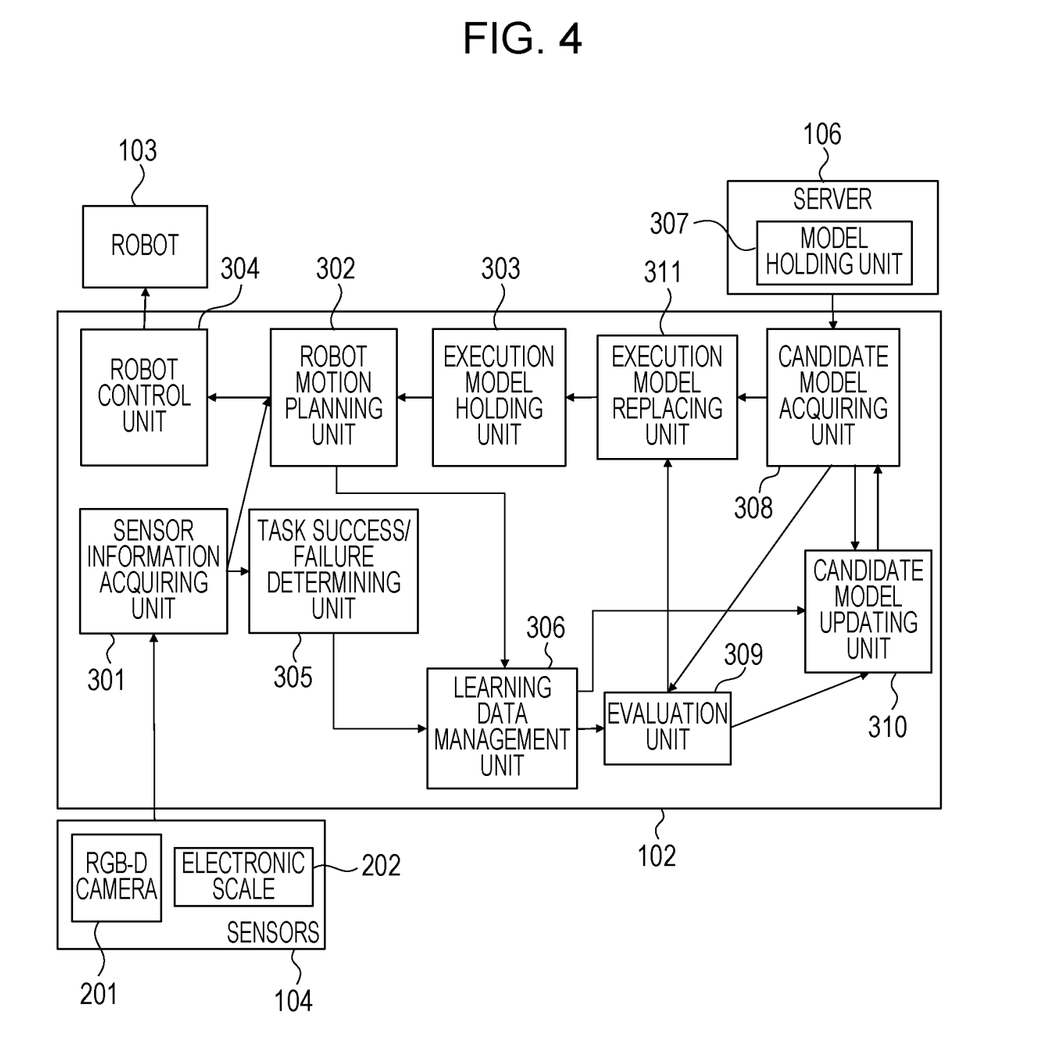
FIG. 4 is a diagram illustrating a functional configuration of the robot controlling apparatus.

FIG. 4 is a diagram illustrating the functional configuration of the robot controlling apparatus 102.

A sensor information acquiring unit 301 acquires sensor information from the sensors 104. More specifically, the sensor information in the embodiment includes an RGB image and a depth image that are acquired from the RGB-D camera 201 and weight information that is acquired from the electronic scale 202. It is assumed herein that an RGB image and a depth image have been subjected to position alignment and are associated with each other on a pixel-by-pixel basis.

A robot motion planning unit 302 recognizes a suction position on a target object in the RGB image acquired from the sensor information acquiring unit 301 by using the execution model held by an execution model holding unit 303. The robot motion planning unit 302 acquires a depth value associated with the suction position, recognized in the RGB image, in the depth image acquired from the sensor information acquiring unit 301 to compute a suction position and orientation in a three-dimensional space expressed by the camera coordinate system. The robot motion planning unit 302 generates a series of paths through which the arm of the robot 103 is moved to the computed suction position and orientation and picks up the target object.

A robot control unit 304 controls the robot 103 in accordance with the series of paths, thus causing the robot 103 to perform a task.

A task success/failure determining unit 305 obtains a difference between pieces of weight information acquired from the sensor information acquiring unit 301 before and after the robot 103 picks up the target object, thereby determining whether the target object 204 has been successfully picked up.

A learning data management unit 306 includes a database that manages a large number of pieces of learning data. Each piece of learning data includes sensor information used as an input when the robot motion planning unit 302 recognizes a suction position on a target object, recognition information to be output in response to the sensor information, and generation time of the recognition information. The learning data will be used later for incremental learning and performance evaluation of a candidate model.

The server 106 includes a model holding unit 307, which holds models to be distributed to users.

A candidate model acquiring unit 308 acquires a model held by the model holding unit 307 in the server via the Internet and holds the model.

An evaluation unit 309 evaluates performance of a candidate model acquired by the candidate model acquiring unit 308 by using the learning data obtained from the learning data management unit 306 and determines, based on an evaluation result, whether to update the candidate model or to replace the execution model with the candidate model.

A candidate model updating unit 310 performs incremental learning of the candidate model acquired by the candidate model acquiring unit 308. More specifically, the candidate model updating unit 310 updates learning parameters of the candidate model acquired by the candidate model acquiring unit 308 with the learning data obtained from the learning data management unit 306.

The candidate model updating unit 310 repeats updating the learning parameters of the candidate model until an evaluation result of the candidate model evaluated by the evaluation unit 309 exceeds a predetermined performance level.

An execution model replacing unit 311 replaces the model held by the execution model holding unit 303 with the candidate model held by the candidate model acquiring unit 308.

Figure 5A:
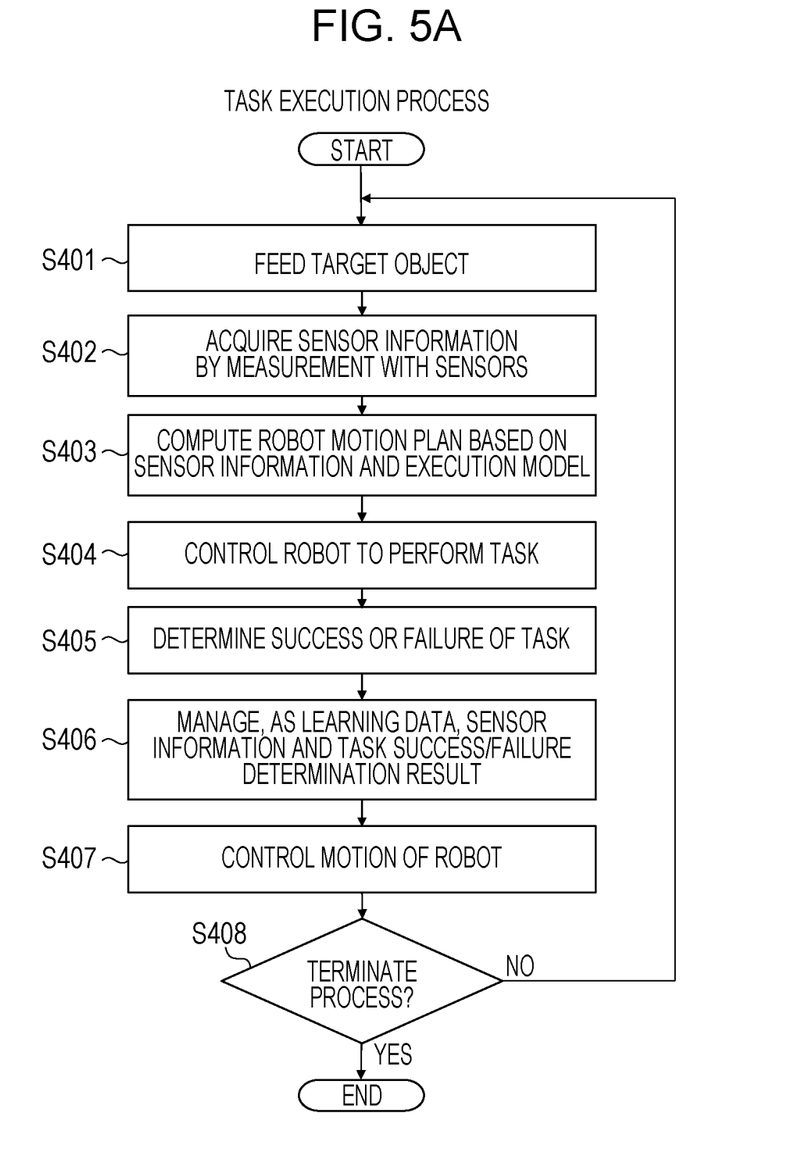
FIG. 5A is a flowchart illustrating an example of information processing.
Figure 5B:
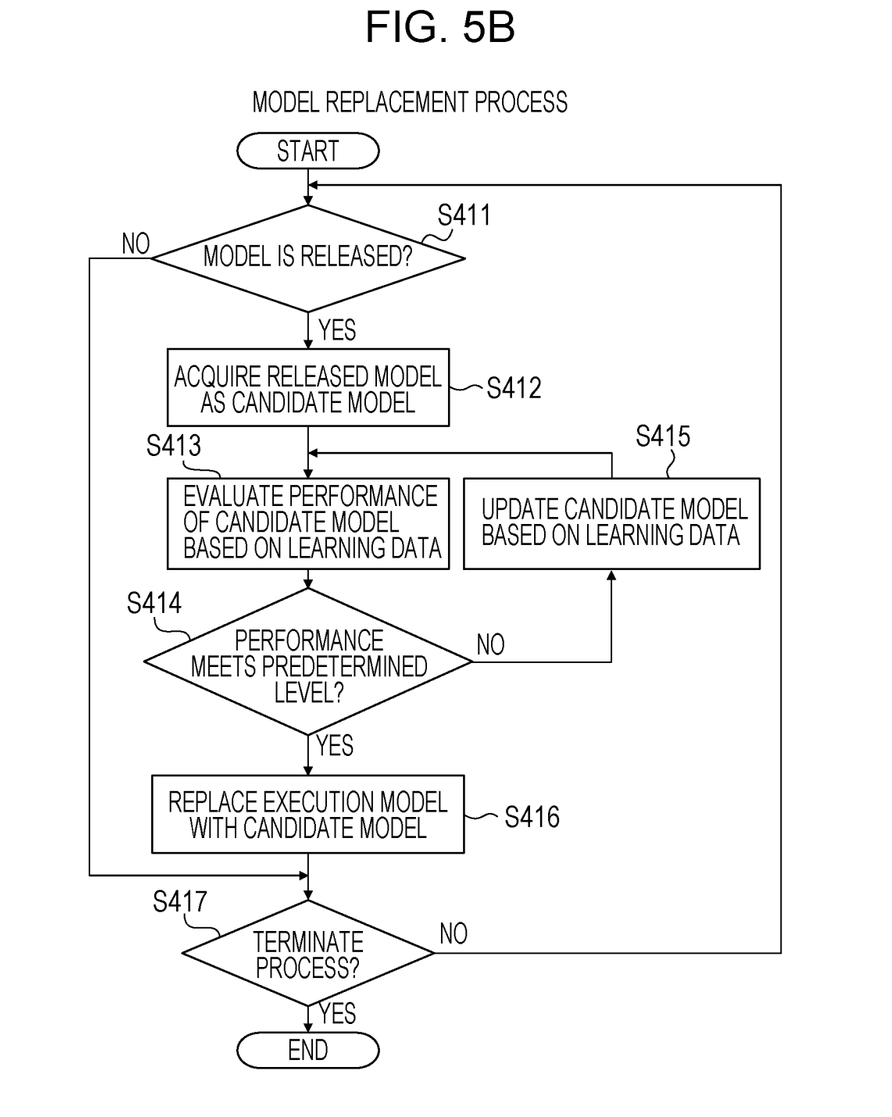
FIG. 5B is a flowchart illustrating an example of information processing.

FIGS. 5A and 5B include flowcharts each illustrating an example of information processing by the robot controlling apparatus 102. The robot controlling apparatus 102 executes two processes in parallel. A first process is a task execution process including S401 to S408 illustrated in FIG. 5A. The task execution process is a process in which the robot 103 repeatedly performs an intended task in an environment specific to a user, such as a plant. Furthermore, the task execution process also functions to generate learning data based on sensor information used to perform a task and a determination result indicating success or failure of the task and manage the generated data while the robot 103 is performing the task. The task execution process will now be described in detail.

(S401)

In S401, a feeder located outside the robotic system according to the embodiment feeds the target object 204 onto a pan of the electronic scale 202.

(S402)

In S402, the RGB-D camera 201 measures an RGB image and a depth image. Then, the sensor information acquiring unit 301 acquires the image and the map as sensor information.

(S403)

In S403, the robot motion planning unit 302 computes, as robot motion, a series of paths for picking up the target object, more specifically, a path-based position and orientation before suction, a position and orientation for suction, and a path-based position and orientation after suction of the suction nozzle in the robot coordinate system. The sensor information acquiring unit 301 acquires, as sensor information, an RGB image and a depth image from the RGB-D camera 201. Then, the robot motion planning unit 302 computes, based on the execution model, a suction position on the target object in the RGB image. In the embodiment, the execution model is a neural network model that receives a local image patch as an input and outputs recognition information indicating whether a point at the center of the local image patch can be sucked. An output value represents a probability belonging to a class representing that the point can be sucked (possible suction) or a class representing that the point cannot be sucked (impossible suction). The sum of probabilities belonging to the two classes is normalized to 1. To compute a suction position on the target object by using this model, the robot motion planning unit 302 scans across the RGB image to generate a large number of local image patches. Each local image patch has a size indicating a range that is just enough to determine a suction position on the target object in the RGB image (for example, the number of pixels corresponding to one side of a square surrounding an area occupied by the target object in the image, captured by imaging the target object from a predetermined position, with a predetermined margin). The size of each local image patch is previously set by the user. The robot motion planning unit 302 inputs the local image patches to the execution model, thereby obtaining recognition information, namely probabilities indicating possible suction at points associated with the patches. Thus, the robot motion planning unit 302 determines, as a suction position on the target object in the image, a computed position in the original RGB image that corresponds to the center of the image patch having the highest probability indicating possible suction. Then, the robot motion planning unit 302 acquires a depth value at the suction position on the target object in the RGB image from the depth image. The robot motion planning unit 302 determines, as a position component of a three-dimensional suction position and orientation in the camera coordinate system 206, a point at a distance expressed by the depth value from the origin of the camera coordinate system 206 in a direction to the suction position in the RGB image. The robot motion planning unit 302 determines, as an orientation component of the suction position and orientation, a direction of the normal to the surface of the target object in the vicinity of the suction position, and the surface of the target object is computed from the depth image. As described above, the robot motion planning unit 302 can compute the suction position and orientation, which the suction nozzle has to maintain during suction, in the camera coordinate system 206. The robot motion planning unit 302 converts the computed suction position and orientation into a suction position and orientation in the robot coordinate system in accordance with the previously computed relative coordinate conversion between the camera coordinate system and the robot coordinate system. Then, the robot motion planning unit 302 computes path-based positions and orientations, which the suction nozzle has to take before and after suction, based on the suction position and orientation in the robot coordinate system. Each path-based position and orientation is a position and orientation obtained by translating the suction position and orientation by a fixed offset distance, previously set by the user, in a direction away from the object. As described above, the paths for a suction operation of the robot 103, that is, the path-based position and orientation before suction, the position and orientation for suction, and the path-based position and orientation after suction of the suction nozzle in the robot coordinate system are determined.

(S404)

In S404, the robot control unit 304 controls the robot 103 in accordance with the robot motion computed in S403 to perform a task. More specifically, the robot control unit 304 gives the robot 103 an instruction to move the suction nozzle to the path-based position and orientation before suction, thereby moving the suction nozzle to the path-based position and orientation before suction. Then, the robot control unit 304 gives the robot 103 an instruction to move the suction nozzle to the position and orientation for suction, thereby moving the suction nozzle to the position and orientation for suction. Then, the robot control unit 304 gives the robot 103 an instruction to start air suction through the suction nozzle, thereby holding the target object by suction. After that, the robot control unit 304 gives the robot 103 an instruction to move the suction nozzle to the path-based position and orientation after suction, thereby moving the suction nozzle to the path-based position and orientation after suction.

(S405)

In S405, the task success/failure determining unit 305 determines success or failure of the task performed in S404. More specifically, the sensor information acquiring unit 301 acquires a weight from the electronic scale 202 after the task is performed. If the weight is equal to a value obtained by subtracting the weight of one target object from a weight measured previously under conditions where the target object is placed or before the object is picked up, the task success/failure determining unit 305 determines that the object has been successfully picked up. If not, the task success/failure determining unit 305 determines the failure.

(S406)

In S406, the learning data management unit 306 generates learning data based on sensor information and the success or failure of the task determined in S405 and manages the data. More specifically, the sensor information in this step is a local image patch in the RGB image that is determined as a suction position in S403 and has the highest probability of possible suction. The learning data management unit 306 receives a local image patch from the robot motion planning unit 302. If the task success/failure determination result in S405 is success, the learning data management unit 306 determines "possible suction" as a ground truth label to be output when this local image patch is recognized. If the task success/failure determination result in S405 is failure, the learning data management unit 306 determines "impossible suction" as a ground truth label to be output when this local image patch is recognized. The learning data management unit 306 adds and stores, as a piece of learning data, a combination of the local image patch, the ground truth label representing possible or impossible suction, and the time of capture of an original image, from which the local image patch is extracted, to the learning data management unit 306.

(S407)

In S407, the robot control unit 304 controls the robot 103 to perform an intended task for the picked-up target object. The intended task in the embodiment is a task to move the suction nozzle holding the target object by suction to a previously set, predetermined position and release the target object by stopping air suction.

(S408)

In S408, the robot control unit 304 determines whether to terminate the task execution process. If the robot control unit 304 determines not to terminate the task execution process, the process is repeated from S401. If the robot control unit 304 determines to terminate the task execution process, the task execution process of FIG. 5A is terminated.

With the task execution process including the above-described operations, learning data in the latest plant environment can be collected and accumulated during repeated execution of an intended task while the robotic system is being in operation in the user plant.

A second process is a model replacement process including S411 to S417 illustrated in FIG. 5B. In the model replacement process, the robot controlling apparatus 102 periodically determines whether a new model is released on the server, and acquires a new model as a candidate model if the new model is released. The robot controlling apparatus 102 performs incremental learning so that the candidate model has performance meeting a level required in the user environment and then replaces the execution model with the candidate model. The model replacement process will be described in detail below.

(S411)

In S411, the candidate model acquiring unit 308 determines whether a new model is released on the server 106. If the candidate model acquiring unit 308 determines that no new model is released, the process proceeds to S417. If the candidate model acquiring unit 308 determines that a new model is released, the process proceeds to S412.

(S412)

In S412, the candidate model acquiring unit 308 acquires the new model held by the model holding unit 307 of the server 106 via the network. The acquired model is held as a candidate model in a storage area managed by the candidate model acquiring unit 308.

(S413)

In S413, the evaluation unit 309 evaluates performance of the candidate model held by the candidate model acquiring unit 308 with learning data managed by the learning data management unit 306. The evaluation unit 309 acquires learning data that is used for evaluation from the learning data management unit 306. The learning data management unit 306 randomly shuffles and classifies pieces of learning data managed in the database into two groups, learning data for evaluation and learning data for incremental learning, which will be described later. The learning data management unit 306 gives the learning data for evaluation to the evaluation unit 309. Then, the evaluation unit 309 inputs a local image patch included in each piece of the acquired learning data to the candidate model to compute a probability of either one of the two classes representing possible suction and impossible suction, and determines a class with higher probability as a recognition result associated with the piece of learning data. The evaluation unit 309 checks the recognition result against a ground truth label representing possible or impossible suction included in the piece of learning data to determine whether the recognition result is true or false. The evaluation unit 309 performs the above-described evaluation processing on each of the pieces of learning data received to compute a correct recognition rate, and determines the computed rate as a performance evaluation result of the candidate model.

(S414)

In S414, the evaluation unit 309 determines whether the performance evaluation result computed in S413 meets a predetermined performance level. The predetermined performance level is a fixed value previously set in the robotic system based on a success rate that the user requires for a task that is being performed by the robotic system. If the evaluation unit 309 determines that the evaluation result does not meet the level, the process proceeds to S415. If the evaluation unit 309 determines that the evaluation result meets the level, the process proceeds to S416. If the evaluation result does not meet the level after processing in S415 is repeatedly performed for a predetermined period of time or a predetermined number of times, the evaluation unit 309 discards the candidate model and the process proceeds to S417.

(S415)

In S415, the candidate model updating unit 310 updates the candidate model held by the candidate model acquiring unit 308. The candidate model updating unit 310 acquires learning data that is used for learning from the learning data management unit 306. Then, the candidate model updating unit 310 inputs a local image patch included in each piece of the acquired learning data to the candidate model to obtain an output value indicating either one of the probabilities of the two classes whose sum is 1 and that represent possible suction and impossible suction. Additionally, the candidate model updating unit 310 acquires a ground truth value, which the candidate model should output, from the ground truth label included in the piece of learning data and representing possible or impossible suction. More specifically, if the ground truth label represents possible suction, the candidate model updating unit 310 determines that the probability of possible suction is 1. If the ground truth label represents impossible suction, the candidate model updating unit 310 determines that the probability of possible suction is 0. The candidate model updating unit 310 defines an error between the output value output by the candidate model and the ground truth value as a cross-entropy error. Then, the candidate model updating unit 310 updates learning parameters of the candidate model to minimize the error using stochastic gradient descent.

(S416)

In S416, the execution model replacing unit 311 replaces the execution model held by the execution model holding unit 303 with the candidate model held by the candidate model acquiring unit 308.

(S417)

In S417, for example, the candidate model updating unit 310 determines whether to terminate the model replacement process. If the candidate model updating unit 310 determines not to terminate the model replacement process, the process is repeated from S411. If the candidate model updating unit 310 determines to terminate the model replacement process, the model replacement process of FIG. 5B is terminated.

Since the model replacement process including the above-described operations is performed in parallel with the task execution process, a model newly released on the external server can be subjected to incremental learning with the latest learning data in the background, and the execution model can be replaced with the released model at the time when the released model subjected to incremental learning meets the predetermined performance level. Thus, the execution model can be replaced with the model acquired from the external server without any reduction in task success rate of the robot 103 in operation in the user plant and without performing a task in a trial-and-error manner for incremental learning through the robot 103.

(First Modification)

When planning motion of the robot 103 in S403 in the embodiment, the robot motion planning unit 302 uses the local image patches generated from the RGB image as information that is input to the model in order to compute recognition information. The input information is not limited to local image patches. For example, the robot motion planning unit 302 may use an RGB image as an input. In this case, the robot motion planning unit 302 uses, as a model, a neural network model that receives, as an input, all pixels of an RGB image and outputs a pixel position corresponding to a portion that can be gripped in the image. In this case, sensor information for learning data that is generated by the learning data management unit 306 in S406 includes all pixels of an RGB image acquired when the task success/failure determination result is "success", and a ground truth label for recognition information to be output indicates a pixel position corresponding to a portion that can be gripped in the image. In S413, the evaluation unit 309 determines that a recognition result is true if the distance between a pixel position output by the model and a pixel position indicated by a ground truth label is less than a predetermined distance. The evaluation unit 309 performs the above-described evaluation processing on each of the pieces of learning data received to compute a correct recognition rate, and determines the computed rate as a performance evaluation result of the candidate model. Furthermore, in S415, the candidate model updating unit 310 obtains the squared distance between a pixel position that the candidate model outputs in association with each of the pieces of learning data and a pixel position indicated by a ground truth label and defines the sum of the squared distances as an error. Then, the candidate model updating unit 310 updates learning parameters of the candidate model to minimize the error using stochastic gradient descent.

(Second Modification)

According to the above-described method, the process in the embodiment is performed using all pixels of an RGB image as information that is input to the model. Pairs of all pixels of an RGB image and all pixels of a depth image may be used as inputs. In this case, the robot motion planning unit 302 uses, as a model, a neural network model that receives an RGB image and a depth image as inputs and outputs a pixel position corresponding to a portion that can be gripped in the image. The rest of the process is the same as that in the above-described method in which all pixels of an RGB image are used as inputs. As described above, any sensor information may be used in S403 as long as recognition information used to plan motion of the robot 103 can be computed based on the sensor information.

(Third Modification)

Although the task success/failure determining unit 305 determines success or failure of a task based on a weight acquired from the electronic scale 202 in S405 in the embodiment, the success or failure of a task may be determined in another way. For example, the task success/failure determining unit 305 may make a determination based on an air pressure. In this case, the sensor information acquiring unit 301 acquires an air pressure from an ejector, which is one of the sensors 104, used to supply negative pressure air to the suction hand. The task success/failure determining unit 305 may detect suction of the target object 204 in response to a predetermined increase in air pressure from a given value in a state where the suction nozzle 203 holds no object by suction, thus determining that the task has been successfully performed. Furthermore, the task success/failure determining unit 305 may determine success or failure of a task based on an image. In this case, the sensor information acquiring unit 301 acquires an image from a success/failure determination camera, which is optically disposed as one of the sensors 104. After the robot arm holds the target object 204 by suction, the robot control unit 304 moves the robot arm to a predetermined position and causes the success/failure determination camera to capture an image. The task success/failure determining unit 305 may detect the presence or absence of the target object in the captured image by image processing and determine, based on the presence of the target image in the captured image, that the target object 204 has been successfully held by suction. As described above, any sensor information may be used in S405 as long as the success or failure of a task can be determined based on the sensor information.

(Fourth Modification)

The learning data managed by the learning data management unit 306 in the embodiment is not limited to the learning data generated in S406 by operating the robot 103 with the execution model used currently. The learning data managed by the learning data management unit 306 may be learning data obtained before replacement with the current execution model, or obtained by performing the task execution process of FIG. 5A with a first-previous-generation execution model and added to a management target. Similarly, the learning data managed by the learning data management unit 306 may be learning data obtained by performing the task execution process of FIG. 5A with a second-or-greater-previous-generation execution model and added to the management target. In addition, the learning data managed by the learning data management unit 306 may be learning data obtained by performing the task execution process of FIG. 5A with a special execution model that the robot controlling apparatus 102 holds to generate learning data and added to the management target. Furthermore, the learning data managed by the learning data management unit 306 may be a mixture of learning data generated with different execution models like those described above. As described above, any execution model other than a candidate model may be used in the task execution process of FIG. 5A.

(Fifth Modification)

Although all of the pieces of learning data managed by the learning data management unit 306 are used for evaluation and incremental learning of a candidate model in the embodiment, a subset of the pieces of learning data may be selected and used. For example, pieces of learning data may be selected such that a set proportion of pieces of learning data whose generation time is after a set time of day are contained. For example, in cases where an illumination layout is changed every month in a user environment, pieces of learning data may be selected such that learning data generated within one month accounts for 50 percent of the selected learning data. This enables an acquired candidate model to be subjected to evaluation and incremental learning in conformity with a recent environment if the environment where the user uses the robot 103 has changed. As another way of selecting pieces of learning data, the pieces of learning data may be selected based on features of sensor information for the learning data. In the case where the execution model is a neural network model, a feature extraction layer of the model is used to extract feature vectors of local image patches from learning data, and pieces of learning data are selected such that a covariance matrix of the feature vectors increases. This enables an acquired candidate model to be subjected to evaluation and incremental learning in conformity with a greater variety of situations in a varying user environment. Furthermore, when the learning data management unit 306 adds new learning data to the management target in S406, pieces of learning data may be selected in the above-described manner and unnecessary pieces of learning data may be eliminated. Alternatively, all pieces of learning data may be added to the management target in S406, and pieces of learning data may be selected in S413 or S415 when the learning data management unit 306 gives the learning data to the evaluation unit 309 or the candidate model updating unit 310.

(Sixth Modification)

Although a picking task has been described as an exemplary task in the embodiment, the task may be another task. For example, the task may be a mounting task to mount a target object that is being held by suction on a destination object. For such a mounting task, the suction nozzle 203 attached to the robot 103 holds the target object by suction. In S402, the RGB-D camera 201 acquires sensor information indicating measurement of the target object and the destination object, more specifically, an overhead perspective RGB image obtained by capturing an image of the two objects from an overhead perspective. In S403, to plan the motion of the robot 103, the robot motion planning unit 302 uses a neural network model that receives an overhead perspective RGB image as an input and outputs relative positions and orientations of the target object and the destination object. In S405, the task success/failure determining unit 305 determines success or failure of a mounting task with an overhead perspective RGB image captured after execution of the task by image processing. Sensor information for learning data generated by the learning data management unit 306 in S406 is an overhead perspective RGB image used to plan the motion of the robot 103 and resulting in "success" as a determination as to success or failure of the task. A ground truth label of recognition information to be output indicates relative positions and orientations of the target object and the destination object. In S413, the evaluation unit 309 determines that the recognition result is true if an error between the relative positions and orientations of the two objects output from the model and those indicated by the ground truth label is less than a predetermined value. The term "error between the relative positions and orientations" as used herein refers to the weighted sum of the difference between translational components of the positions and the orientations and the difference between orientation components thereof. The above-described evaluation processing is performed on each of the pieces of learning data received by the evaluation unit 309 to compute a correct recognition rate, and the computed rate is determined as a performance evaluation result of the candidate model. Furthermore, in S415, the candidate model updating unit 310 obtains the squared distance between relative positions and orientations of the two objects that the candidate model outputs in association with each of the pieces of learning data and relative positions and orientations indicated by a ground truth label, and defines the sum of the squared distances as an error. Then, the candidate model updating unit 310 updates learning parameters of the candidate model to minimize the error using stochastic gradient descent. As described above, any task may be performed in the embodiment as long as motion of the robot 103 can be planned in the task by recognition processing using a model that receives sensor information as an input.

(Seventh Modification)

Although the robot controlling apparatus 102 acquires a model from the server 106 in the embodiment, the server may be a robot controlling apparatus that another user uses. This allows a model developed or subjected to learning by another user to be introduced as an execution model without performing a task in a trial-and-error manner in the original user environment.

(Eighth Modification)

In S414 in the embodiment, the evaluation unit 309 determines, based on the fixed value previously set by the user, whether the performance evaluation result computed in S413 meets the predetermined performance level. However, the user may determine whether the evaluation result meets the predetermined performance level. In this case, the evaluation unit 309 causes the display unit 13 to display information that enables the user to grasp a performance evaluation result, more specifically, a correct recognition rate computed in S413 and output values output from the candidate model in response to input local image patches of the respective pieces of learning data. The user determines whether the performance evaluation result computed in S413 meets the predetermined performance level by referring to the information displayed on the display unit 13, and the evaluation unit 309 receives a determination result input by the user through the input unit 14. This processing is an example of receiving processing of receiving a determination as to whether to replace the execution model with the candidate model. Thus, the user can flexibly determine, depending on the user's situation, whether to replace the execution model with the candidate model.

Second Embodiment

In a second embodiment, a robotic system that is installed in a user plant and performs a task to suck and pick up a target object with a suction hand will be taken as an example, and a method whereby the robotic system automatically selects a candidate model having the best performance from candidate models released on multiple external servers and introduces the selected model will be described. In this embodiment, the robotic system performs a task with an execution model currently held in the system to collect learning data. The robotic system evaluates performance of each of multiple candidate models newly acquired in the background by using the learning data, and replaces the execution model currently used with a candidate model if the performance of the candidate model having the best performance is better than that of the execution model. As described above, a model having the best performance can be selected from multiple models released on servers and introduced into a user system without performing a task for performance evaluation through a robot 103.

Figure 6:
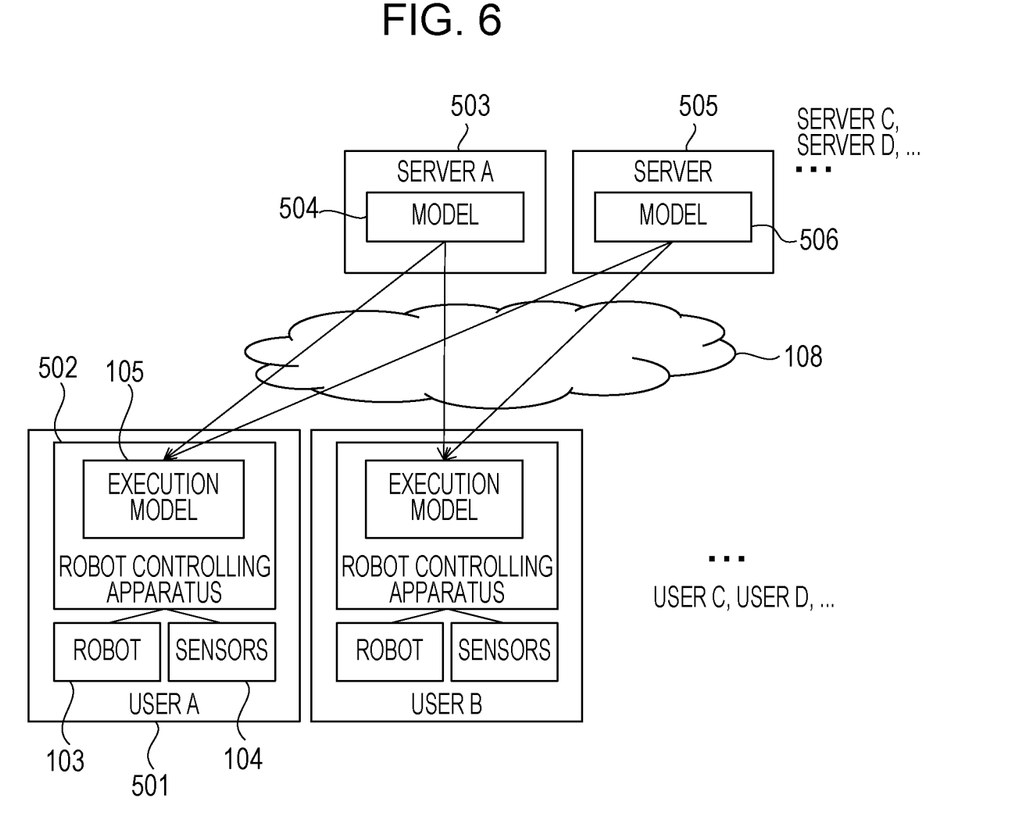
FIG. 6 is a diagram illustrating exemplary schematic configurations of robotic systems.

FIG. 6 is a diagram illustrating schematic configurations of robotic systems and a relationship between the robotic systems and external servers, for example. A robotic system 501 is a robotic system that a user A uses. The robotic system 501 includes a robot controlling apparatus 502, a robot 103 connected to the robot controlling apparatus 502, and sensors 104. The robot controlling apparatus 502 holds therein an execution model 105. The robot 103, the sensors 104, and the execution model 105 are similar to those described in the first embodiment. The robot controlling apparatus 502 controls the robot 103 based on a recognition result to perform a task. The robot controlling apparatus 502 is connected to multiple external servers, for example, a server A 503 and a server B 505, via the Internet 108. When the server A 503 releases a new model 504 or when the server B 505 releases a new model 506, the robot controlling apparatus 502 acquires a released model as a candidate model via a network. The robot controlling apparatus 502 evaluates performance of the candidate model, and replaces the execution model 105 with the candidate model if the evaluated performance meets a predetermined performance level. Each robot controlling apparatus is connected to the multiple servers and can acquire a model from any server.

For an appearance and coordinate systems of the robotic system 501, the appearance and the coordinate systems are the same as those in FIG. 2 in which the robot controlling apparatus 102 in the first embodiment is replaced with the robot controlling apparatus 502 in the present embodiment. In addition, a hardware configuration of the robotic system 501 is also the same as that in FIG. 3 in which the robot controlling apparatus 102 in the first embodiment is replaced with the robot controlling apparatus 502 in the present embodiment.

Figure 7:
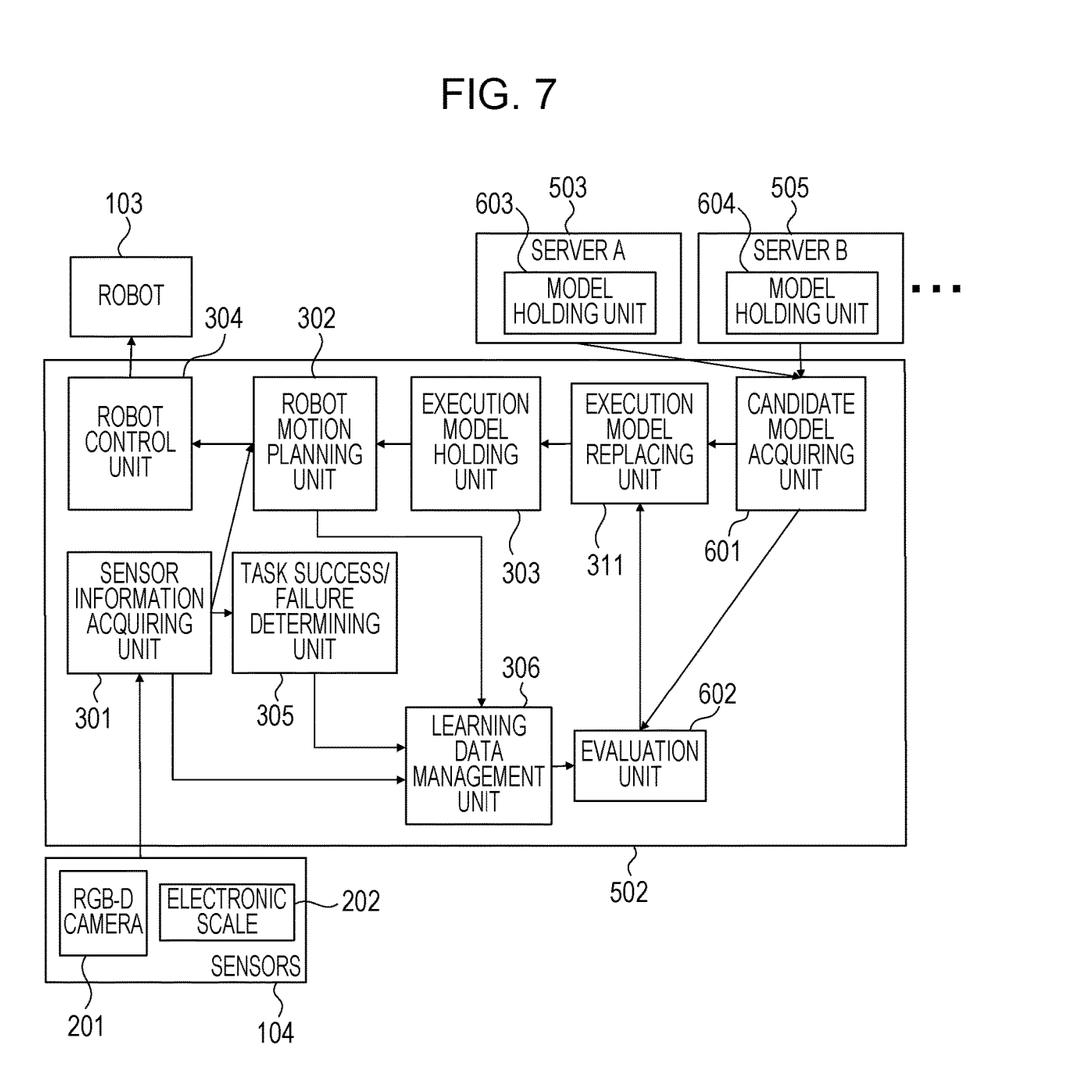
FIG. 7 is a diagram illustrating a functional configuration of a robot controlling apparatus.

FIG. 7 is a diagram illustrating a functional configuration of the robot controlling apparatus 502. In the robot controlling apparatus 502 in the present embodiment, the candidate model updating unit 310 is removed from the components of the robot controlling apparatus 102 in the first embodiment illustrated in FIG. 4. Therefore, update of learning parameters of a candidate model is not performed. Furthermore, the candidate model acquiring unit 308 and the evaluation unit 309 are functionally changed to a candidate model acquiring unit 601 and an evaluation unit 602. The robot controlling apparatus 502 is connected to multiple servers, for example, the server A 503 and the server B 505. The candidate model acquiring unit 601 and the evaluation unit 602, which have different functions as those in the first embodiment, will now be described.

The candidate model acquiring unit 601 acquires a model held by a model holding unit 603 of the server A 503, which is connected to the robot controlling apparatus 502, or a model holding unit 604 of the server B 505, which is connected to the robot controlling apparatus 502, via the Internet and holds the acquired model.

The evaluation unit 602 evaluates performance of the candidate model acquired by the candidate model acquiring unit 601 with learning data obtained from the learning data management unit 306 and determines, based on an evaluation result, whether to replace the execution model with the candidate model.

More specific details of processing performed by the robot controlling apparatus 502 in this embodiment will be now described with reference to a flowchart. The robot controlling apparatus 502 executes two processes in parallel. A first process is the task execution process including S401 to S408 in FIG. 5A and details of the first process are the same as those described in the first embodiment. A second process is a model replacement process including S701 to S706 in FIG. 8. In the model replacement process, whether a new model is released on the multiple servers connected to the robot controlling apparatus 502 is periodically determined. When it is determined that a new model is released, the new model is acquired as a candidate model. If the candidate model has performance that meets a level required in a user environment, the execution model is replaced with the candidate model. The model replacement process will be described in detail below.

(S701)

Figure 8:
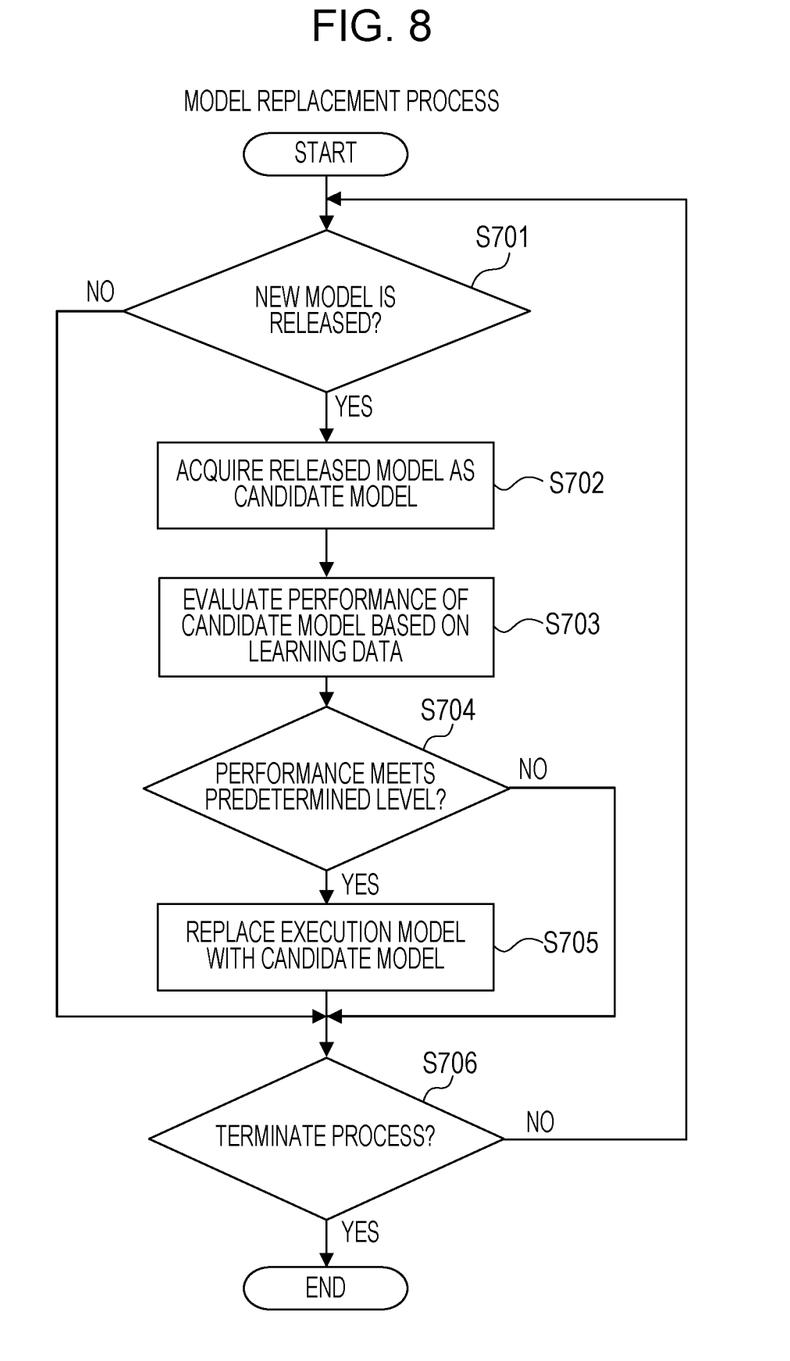
FIG. 8 is a flowchart illustrating an example of information processing.

In S701, the candidate model acquiring unit 601 sequentially determines whether a new model is released on either the server A 503 or the server B 505. If the candidate model acquiring unit 601 determines that a new model is not released on any server, the process proceeds to S706. If the candidate model acquiring unit 601 detects a new model released on any server, the process proceeds to S702 in response to the detection.

(S702)

In S702, the candidate model acquiring unit 601 acquires the new model detected in S701 from the server relevant to the model via the network. The acquired model is held as a candidate model in a storage area managed by the candidate model acquiring unit 601.

(S703)

In S703, the evaluation unit 602 evaluates performance of the candidate model, held by the candidate model acquiring unit 601, with learning data managed by the learning data management unit 306. The evaluation unit 602 acquires learning data that is used for evaluation from the learning data management unit 306. The learning data management unit 306 randomly shuffles and classifies pieces of learning data managed in the database into two groups, learning data for evaluation and learning data for incremental learning. The learning data management unit 306 gives the learning data for evaluation to the evaluation unit 602. Then, the evaluation unit 602 inputs a local image patch included in each piece of the acquired learning data to the candidate model to compute a probability of either one of the two classes representing possible suction and impossible suction, and determines a class with higher probability as a recognition result associated with the piece of learning data. The evaluation unit 602 checks the recognition result against a ground truth label representing possible or impossible suction included in the piece of learning data to determine whether the recognition result is true or false. The evaluation unit 602 performs the above-described evaluation processing on each of the pieces of learning data received to compute a correct recognition rate, and determines the computed rate as a performance evaluation result of the candidate model.

(S704)

In S704, the evaluation unit 602 determines whether the performance evaluation result computed in S703 meets a predetermined performance level. The predetermined performance level is a result obtained by evaluating performance of the execution model, which is used currently, in the same manner as that in S703. If the evaluation result of the candidate model is better than that of the execution model, the evaluation unit 602 determines that the performance of the candidate model meets the level, and the process proceeds to S705. If not, the evaluation unit 602 determines that the performance of the candidate model does not meet the level, and the process proceeds to S706.

(S705)

In S705, the execution model replacing unit 311 replaces the execution model held by the execution model holding unit 303 with the candidate model held by the candidate model acquiring unit 601.

(S706)

In S706, for example, the evaluation unit 602 determines whether to terminate the model replacement process. If the evaluation unit 602 determines not to terminate the model replacement process, the process is repeated from S701. If the evaluation unit 602 determines to terminate the model replacement process, the model replacement process of FIG. 8 is terminated.

Performing the model replacement process including the above-described operations in parallel with the task execution process can select a model having the best performance from models released on multiple external servers and replace the execution model with the selected model. As described above, a model having the best performance can be always selected from available models, and the selected model can be used as an execution model for the robot controlling apparatus 502 in operation in the user plant.

(Modification)

In the embodiment, the candidate model acquiring unit 601 sequentially determines in S701 whether a new model is released on either the server A 503 or the server B 505. If the candidate model acquiring unit 601 detects a new model released on either one of the servers, the process proceeds to S702 in response to the detection. The robot controlling apparatus 502 sequentially performs the operations from S702. However, the process does not have to proceed to S702 as soon as the candidate model acquiring unit 601 detects the first new model. The candidate model acquiring unit 601 may first check all of the servers to acquire all new candidate models. In this case, the robot controlling apparatus 502 performs the operations in S702 and S703 in parallel to compute performance evaluation results of the candidate models. Then, the robot controlling apparatus 502 performs the operations from S704 on a candidate model exhibiting the highest performance evaluation result. Thus, the optimum candidate model for replacement can be detected more quickly.

Other Embodiments

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

Although exemplary embodiments of the present invention have been described in detail, the present invention is not limited to the specific embodiments.

For example, the robot controlling apparatus 102 may include a plurality of communication I/Fs. For example, the robot controlling apparatus 102 may include a communication I/F for the robot 103, a communication I/F for the server 106, and a communication I/F for the sensors 104.

Furthermore, the robot controlling apparatus 102 may include a plurality of CPUs and a plurality of memories. The CPUs may use the memories and execute processing based on programs stored in the memories.

Furthermore, a subset or all of the functional components of the robot controlling apparatus 102 illustrated in FIGS. 4 and 7 may be incorporated as hardware components in the robot controlling apparatus 102.

According to the above-described embodiments, a model acquired from the outside of a robotic system installed in a user environment can be introduced into the user's robotic system without performing a task in a trial-and-error manner through the robotic system.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
a first acquiring unit configured to acquire, from an external apparatus which can communicate with the information processing apparatus via a network, a first learning model which outputs recognition information in response to input of image information;
a learning unit configured to cause the first learning model to learn a result of control by the information processing apparatus using recognition information that is output from a second learning model in response to input of the image information in an execution environment;
an evaluation unit configured to evaluate the first learning model based on image information in the execution environment and recognition information that is output as ground truth in response to input of the image information to a learning model;
a replacing unit configured to replace the second learning model with the first learning model that has been learned by the learning unit, in a case where the result of evaluation by the evaluation unit meets the a requirement; and
an output unit configured to cause the first learning model learned by the learning unit to output recognition information by inputting image information in the execution environment to the first learning model.

2. The information processing apparatus according to claim 1, wherein the learning unit updates a coupled weighting coefficient for the first learning model based on the evaluation result of the first learning model obtained by the evaluation unit and recognition information as ground truth associated with the image information.

3. The information processing apparatus according to claim 1, wherein the recognition information as ground truth associated with the image information is learning data obtained by performing a task based on the second learning model, which receives image information as an input and outputs recognition information, and
the learning unit updates the first learning model based on the learning data in a case where performance of the first learning model evaluated by the evaluation unit does not meet a predetermined performance level.

4. The information processing apparatus according to claim 1, wherein the replacing unit replaces the second learning model with the first learning model in a case where performance of the first learning model evaluated by the evaluation unit meets performance that is set as performance required to perform a task.

5. The information processing apparatus according to claim 1, wherein the replacing unit replaces the second learning model with the first learning model in a case where performance of the first learning model evaluated by the evaluation unit meets performance of the second learning model.

6. The information processing apparatus according to claim 1, wherein each of the first learning model and the second learning model has a different neural network structure to each other.

7. The information processing apparatus according to claim 1, wherein the recognition information that is output as ground truth in response to input of image information in the execution environment to a learning model is obtained by adding, to image information in the execution environment, a result of controlling the information processing apparatus based on recognition information output from the second model in response to image information in the execution environment.

8. An information processing method that is performed by an information processing apparatus, the method comprising:
(a) acquiring, from an external apparatus which can communicate with the information processing apparatus via a network, a first learning model which outputs recognition information in response to input of image information;
(b) causing the first model to learn a result of control by the information processing apparatus using recognition information that is output from a second learning model in response to input of the image information in an execution environment;
(c) evaluating the first learning model based on image information in the execution environment and recognition information that is output as ground truth in response to input of the image information to a learning model;
(d) replacing the second learning model with the first learning model that has been learned by the learning unit, in a case where the result of evaluation by an evaluation unit meets a requirement; and
e) causing the first learning model learned in the learning (b) to output recognition information by inputting image information in the execution environment to the first learning model.

9. A non-transitory computer-readable storage medium storing a program which, when read and executed by a computer, cause the computer to executes the step of an information processing method, the method comprising:
(a) acquiring, from an external apparatus which can communicate with the information processing apparatus via a network, a first learning model which outputs recognition information in response to input of image information;
(b) causing the first model to learn a result of control by the information processing apparatus using recognition information that is output from a second learning model in response to input of the image information in an execution environment; and
(c) evaluating the first learning model based on image information in the execution environment and recognition information that is output as ground truth in response to input of the image information to a learning model;
(d) replacing the second learning model with the first learning model that has been learned by the learning unit, in a case where the result of evaluation by an evaluation unit meets a requirement; and
(e) causing the first learning model learned in the learning (b) to output recognition information by inputting image information in the execution environment to the first learning model.

* * * * *